Jan. 10, 1961 K. ZWICK 2,967,382
ROTARY TOOL HOLDER
Filed Sept. 5, 1958
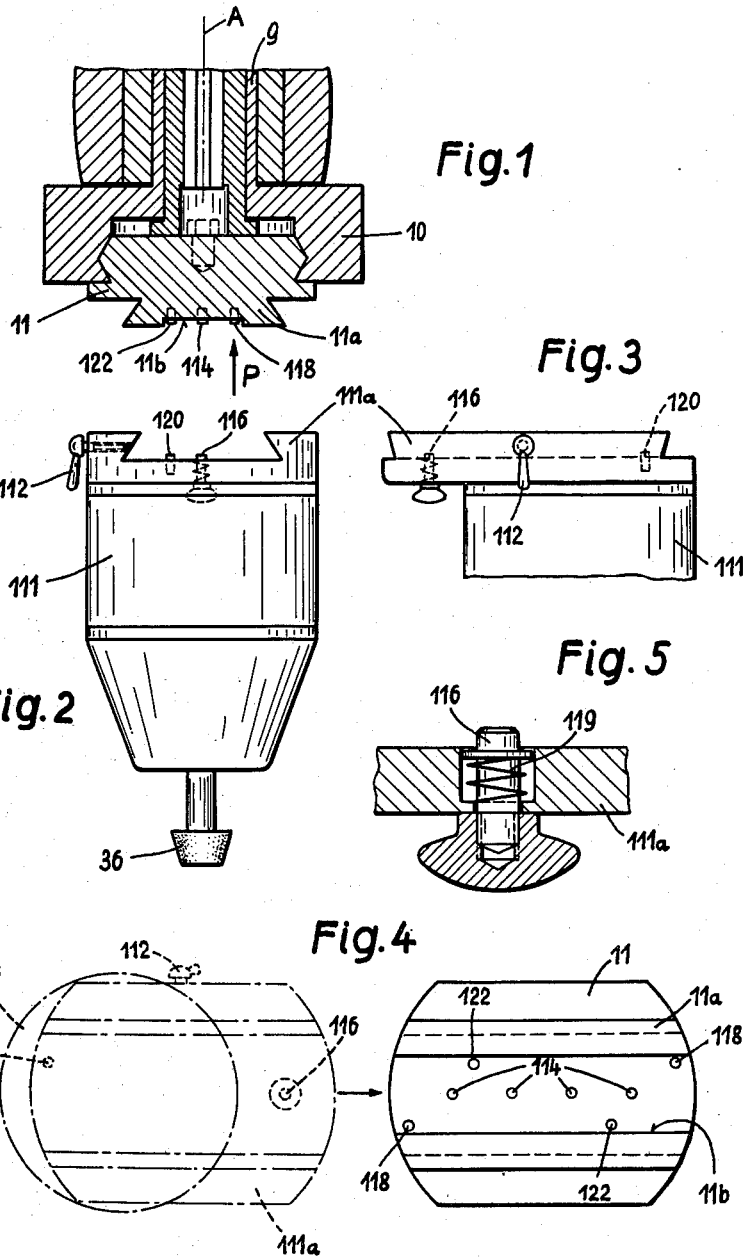

United States Patent Office 2,967,382
Patented Jan. 10, 1961

2,967,382
ROTARY TOOL HOLDER

Kurt Zwick, Munich, Germany, assignor to Hans Deckel, Munich, Germany, and Friedrich Wilhelm Deckel, Zug, Switzerland Filed Sept. 5, 1958, Ser. No. 759,305

Claims priority, application Germany Sept. 13, 1957

8 Claims. (Cl. 51—245)

This invention relates to a machine tool with a main spindle having a tool holder which can be displaced transversely to the axis of rotation by guide means and fixed by clamping means in an adjusted position.

With the known rotary tool holders of this type, in particular with rapidly rotating planetary grinding spindles on grinding machines, there is a great risk of the operator forgetting to fix the tool support by clamping in its guide after setting to the required radial position, with the result that the tool support is thrown out of the guides due to the considerable centrifugal forces after the driving motor has been switched on, which may lead to damage to material and personnel.

The object of the invention is to avoid the above-mentioned disadvantages and to provide precautionary measures for the prevention of such operational accidents. According to the invention, co-operating stop means are provided on the tool holder and on the guides to prevent the tool holder from being thrown out of its guides when the clamping means are not tightened. These stop means should preferably be constructed as stop pins, which come into engagement with each other when the clamping means are not tightened and the machine is switched on, and prevent the tool holder from being thrown out. According to a preferred design, the stop pin on the tool holder is constructed as a stop pin which can be released against resilient force and the counter pins in the slide guide are placed in a row parallel to the guide groove, so that the releasable stop pin can co-operate with the nearest counter pin depending on the radial position of the tool holder in relation to the axis of rotation.

According to a further characteristic of the invention it is advantageous to provide safety means on the slide guide to co-operate with blocking means on the tool holder and allow this to enter into the guide only when both parts are in the correct position. These means can for example also be formed by a securing pin at each end of the guide groove and a strain bolt on the tool holder.

Further characteristics of the invention are explained in more detail in the following description of embodiment shown in the accompanying drawings:

Fig. 1 shows a section of the main spindle with the cross slide.

Figs. 2 and 3 show views of the tool holder in front and side elevation respectively.

Fig. 4 shows the slide guide for the tool holder seen in the direction of the arrow P, and Fig. 5 shows a detail of the apparatus.

The invention will now be described on the basis of a grinding head fitted with a planetary grinding spindle, which is constructed for example according to the features of U.S. patent application, Ser. No. 596,310, filed July 6, 1956, now U.S. Patent No. 2,929,300. For this reason the details of the grinding device described therein which are irrevelant to the present invention have not been mentioned here. In order to facilitate comparison however the same parts of that specification and of the present invention are given the same reference symbols.

The grinding head has a spindle 9 which can be rotated and axially displaced. This spindle is equipped with a slide guide 10 transverse to the axis of rotation, in which the slide 11 of the tool holder, in the present case the grinding wheel 36, is arranged. During rotation of the main spindle 9 the slide 11 undergoes over a control disc a radial displacement which is induced together with the axial forward feed of the spindle for the grinding of conical bores. The control range of the control disc is limited generally to the stroke of its cam, which for reasons of space can be kept only within certain limits. In order to be able to treat workpieces of very widely differing diameter, the actual tool holder 111 is separated from the slide 11 and with the interposition of a slide guide can be adjusted in relation to it, i.e. in relation to the axis of rotation, into various relative positions, and is arranged so as to be fixable in the adjusted position by means of a clamping device.

The slide 11 is equipped for the above purpose with a dovetail-shaped slide guide 11a parallel to the guide on the part 10, on to which slide guide a corresponding slide part 111a of the actual tool holder 111 can be pushed in. At least one clamping screw 112 mounted in the part 111 serves to clamp the tool holder 111 in the adjusted position. By appropriate displacement of the tool holder 111 the grinding wheel 36 can be displaced in relation to the axis of rotation A, i.e. in relation to the axis of the main spindle 9, and thus the radius of the surface to be machined on the workpiece can be adjusted.

In the slide guide 11a a shallow recess 11b is provided, parallel to the slide guide surfaces, in which are mounted a number of stop pins 114. These pins form a row parallel to the slide guide surfaces and project out of the part 11a just far enough to enable them to co-operate with a counter stop pin 116 mounted in the tool support 111, depending on the radial position of the same. The pin 116 is constructed as a latch which can be operated against the force of a spring 119. When the holder 111 is pushed into the guide 11a, the stop pin 116 is retracted and the slide displaced far enough to allow the desired radial position to be reached. Then the resilient stop pin 116 is released by the operator so that it springs in between two of the pins 114. Should the operator have forgotten to tighten the clamping screw 112, when the motor is started the tool support 111 will move outwards as a result of considerable centrifugal forces in its slide guide surfaces 11a, 111a, sufficiently far that the pin 116 strikes the stop pin 114 which is in its way. The pins 114 are so close together that the centrifugal force of part 111 cannot increase to excess on the way from one pin to the other, and further are dimensioned so as to be strong enough to withstand even the maximum centrifugal forces, so that the tool support 111 in the case described does move out of its adjusted position as a result of centrifugal force but only as far as the stop position of the pin 116 on the one of the stop pins 114 next to it. Thus a safe automatic precaution is created with the simplest means, so that the grinding head can on no account be thrown out of its support and possibly cause damage to material and personnel.

In the recess 11b of the guide 11a is secured, as well as the stop pins 114, a blocking pin 118 at each outlet of the recess 11b. This blocking pin is disposed laterally to the row of pins 114 so that it allows the parts 11 and 111 to be pushed into each other only in the correct position, i.e. only when the stop pin 116 first enters the recess 11b (Fig. 4). If however the operator tries to set the tool support in the reverse position, a strain bolt 120 mounted on the part 111a immediately comes into engagement with the blocking pin 118, thus preventing the guide parts 111a from being pushed into the counter guide 11a. As the pins 118 are arranged in the same way on both sides of the recess 11b, pushing in from both sides is only possible in the correct position of the parts 11 and 111.

As well as the said stop pins 114, further stop pins 122 are each provided in the recess 11b of the slide guide. The stop pins co-operate with the blocking pin 120 of the part 111a in the pushed in position and prevent the grinding head with the stop pin 116—seen in the pushing-in direction—from being displaced to behind the row of pins 114, i.e. into a position in which a counter pin 114 is no longer opposite the stop in 116.

The type of construction described is only one possible way of carrying the invention into effect. It would also be possible for the stop means which automatically work together to be otherwise constructed and constituted than only as pins. Also for example instead of a plurality of stop pins only a single pin could be provided on each side of the guide grooves, the dimensions of which would in this case however have to be strong enough to enable it to absorb safely even the centrifugal forces, particularly increased over a longer radial path, from the tool support.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a machine tool, the combination of a spindle, a tool holder, guide means mounted on the spindle for supporting the tool holder so that it can be displaced transversely to the axis of rotation of the spindle, clamping means for fixing the tool holder in an adjusted position, and cooperating stop means provided on the tool holder and the guide means to prevent the tool holder from being thrown out of its guides if the clamping means are not tightened, said stop means including a plurality of individual stop members arranged in a row parallel to said guide means, characterized by the fact that said plurality of individual stop members are mounted in fixed position on said guide means and that said tool holder has a retractable counter stop alined with said row of stop members and in position to engage and be stopped by the next adjacent one of said stop members whenever said tool holder is accidentally moved along said guide means.

2. A machine tool comprising a spindle rotatable on an axis of rotation, a guide member mounted on and rotating with said spindle, said guide member having a guideway extending substantially radially with respect to said axis, a tool holder member mounted on said guide member for movement along said guideway to various positions offset various radial distances from said axis, and a clamp for clamping said tool holder member against movement along said guideway, characterized by safety stops for limiting movement of said tool holder member along said guideway by centrifugal force in case said spindle is rotated without first clamping said tool holder member, said safety stops comprising a plurality of spaced abutments in fixed position on one of said members, and a retractable abutment on the other of said members in position to engage a next adjacent one of said fixed abutments when said tool holder member starts to move radially with respect to said axis under the influence of centrifugal force.

3. A construction as defined in claim 2, in which said spaced abutments are alined with each other in the direction of said guideway.

4. A construction as defined in claim 3, in which said spaced abutments are fixed to said guide member and said retractable abutment is mounted on said tool holder member.

5. A construction as defined in claim 4, in which said retractable abutment is retractable in a direction substantially parallel to said axis of rotation of said spindle and is spring urged to a position for engagement with the next adjacent one of said fixed abutments.

6. A construction as defined in claim 2, in which said tool holder member is elongated in the direction of said guideway, and in which said retractable abutment is mounted on said tool holder member near one end thereof, and in which there are cooperating blocking parts on said members preventing insertion of said tool holder member into said guideway except in a position or orientation in which the end having said retractable abutment is inserted first.

7. A construction as defined in claim 2, in which said tool holder member is elongated in the direction of said guideway, and in which said retractable abutment is mounted on said tool holder member near one end thereof, and in which said spaced abutments in fixed position are mounted on said guide member, and which said members have other cooperating abutment parts limiting movement of said tool holder member relative to said guide member in a direction radially outwardly from said axis of rotation, in case said tool holder member is placed on said guideway in a position in which said retractable abutment is outwardly beyond the last one of said spaced abutments.

8. A construction as defined in claim 7, in which said retractable abutment and said spaced abutments are alined with each other substantially on the center line of said guideway, and in which said other cooperating abutment parts are offset laterally from said center line.

References Cited in the file of this patent

UNITED STATES PATENTS

| 1,271,152 | Fritts | July 2, 1918 |
| 1,839,253 | Olofson | Jan. 5, 1932 |

FOREIGN PATENTS

| 421,167 | Italy | May 19, 1947 |
| 284,532 | Switzerland | July 31, 1952 |